(12) United States Patent
Renneke et al.

(10) Patent No.: US 8,650,862 B2
(45) Date of Patent: Feb. 18, 2014

(54) AGRICULTURAL MACHINE

(75) Inventors: Elmar Renneke, Delbrueck-Ostenland (DE); Kai Brandhofe, Muenster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 167 days.

(21) Appl. No.: 13/226,560

(22) Filed: Sep. 7, 2011

(65) Prior Publication Data
US 2012/0060483 A1 Mar. 15, 2012

(30) Foreign Application Priority Data

Sep. 10, 2010 (DE) .......................... 10 2010 044 978

(51) Int. Cl.
*F01N 3/00* (2006.01)
(52) U.S. Cl.
USPC .................... 60/295; 60/274; 60/286; 60/311
(58) Field of Classification Search
USPC ............................ 60/272, 273, 277, 295, 311
See application file for complete search history.

(56) References Cited

U.S. PATENT DOCUMENTS

| 2005/0166580 A1* | 8/2005 | Pfaeffle et al. | 60/295 |
| 2008/0000219 A1* | 1/2008 | Ratcliff et al. | 60/274 |
| 2010/0109911 A1* | 5/2010 | Vosz | 340/932.2 |
| 2011/0088374 A1* | 4/2011 | Johnson | 60/285 |

* cited by examiner

*Primary Examiner* — Thomas Denion
*Assistant Examiner* — Philip Eklem
(74) *Attorney, Agent, or Firm* — Michael J. Striker

(57) ABSTRACT

An agricultural machine has an internal combustion engine, a particulate filter disposed in an exhaust-system branch of the internal combustion engine, and an engine control unit designed to control the internal combustion engine in a regeneration phase in such a manner that a temperature is reached in the particulate filter that is required for the regeneration thereof, and to abort an on-going regeneration if at least one operating parameter of the machine that influences the regeneration deviates from a setpoint value. A control device of the machine is provided to predict a time period in which it is likely possible to hold the operating parameter to the setpoint value thereof, and to start regeneration when this time period begins.

14 Claims, 2 Drawing Sheets

AGRICULTURAL MACHINE

CROSS-REFERENCE TO RELATED APPLICATION

The invention described and claimed hereinbelow is also described in German Patent Application DE 10 2010 044 978.4 filed on Sep. 10, 2010. This German Patent Application, whose subject matter is incorporated here by reference, provides the basis for a claim of priority of invention under 35 U.S.C. 119(a)-(d).

BACKGROUND OF THE INVENTION

The present invention relates to an agricultural machine comprising an internal combustion engine, a particulate filter disposed in an exhaust-system branch of the internal combustion engine, and an engine control unit designed to prompt regeneration of the particulate filter as needed.

It is known per se to use particulate filters to capture soot particles emitted by a diesel engine during operation. Soot particles settle into capillaries of the filter, thereby causing the pressure drop at the filter to increase during operation; in the extreme case, the filter can become clogged. To prevent such clogging, the filter must be regenerated from time to time by burning off the soot particles deposited therein. The filter must be heated to a great extent in order to burn off the soot. A known approach therefor is to operate the engine at a no-load speed, i.e. with low air throughput, and to manipulate the fuel injection into the engine such that hot exhaust gasses are obtained. Such a manipulation can include, for example, delaying the point of injection of the fuel and increasing the quantity of fuel injected, or injecting the fuel in a plurality of thrusts per working cycle. The fuel that is injected in a delayed manner makes a minimal contribution to the drive power, and a large portion of the energy obtained from the combustion thereof leaves the engine in the form of hot exhaust gas which is used to bring the filter to regeneration temperature.

The heat output that reaches the filter in this manner must be coordinated exactly with the exhaust-gas throughput of the filter because the temperature range in which regeneration can take place is narrow. If the temperature is too low, the soot is not combusted; if the heat output that is supplied is too high, combustion can take place so rapidly that the heat released as a result damages the filter.

Operating at a no-load speed ensures that the exhaust-gas throughput is specified exactly and is limited to a low value, and so a relatively small quantity of fuel suffices to bring the exhaust gas to the required temperature. If the engine speed increases without the quantity of injected fuel being adapted, the exhaust-gas temperature decreases, the filter cools, and regeneration comes to a halt. A conventional engine control unit responds to this situation by aborting the regeneration. If regeneration is incomplete, soot becomes distributed unevenly in the filter. As a result, the quantity of soot in the filter can no longer be assessed reliably by reference to the pressure drop at the filter, and filter damage can occur if the engine is not automatically shut off in advance in a timely manner, because the pressure drop is concentrated at individual parts of the filter loaded heavily with soot, or because a locally thick soot layer releases so much heat in a subsequent regeneration process that the filter becomes damaged.

During practical application, the operator of such a conventional machine is therefore forced to interrupt the use of the machine every time the filter must be regenerated. Such a work interruption can result in considerable economic losses if it occurs at an unfavorable point in time. In particular, if a plurality of machines work together to perform a task, such as harvesting and hauling machines used to harvest a field, an interruption in the operation of one machine affects the other machines, thereby compounding the economic consequences.

SUMMARY OF THE INVENTION

The problem addressed by the present invention is that of creating an agricultural machine that enables such interruptions in operation to be minimized.

The problem is solved, in the case of an agricultural machine comprising an internal combustion engine, a particulate filter disposed in the exhaust-system branch, and an engine control unit designed to control a heat source in a regeneration phase in such a manner that a temperature is reached in the particulate filter that is required for the regeneration thereof, and to abort an on-going regeneration if at least one operating parameter of the machine that influences the regeneration deviates from a setpoint value, in that the machine comprises a control device which is designed to predict a time period in which it is likely possible—i.e. compatible in particular with the requirements for use of the machine—to hold the operating parameter to the setpoint value thereof, and to start regeneration when this time period begins. This makes it possible to carry out regeneration without having to interrupt the use of the machine.

A preferred heat source is the internal combustion engine itself. In that case, it is useful for an engine control unit to be the control unit.

If the setpoint value can be specified at the beginning of every regeneration, it is easier to identify a time period that is suitable for performing regeneration, because the time period would then only need to be characterized by a likely constancy of the operating parameter, and not additionally by a certain value of the operating parameter.

In the case of a self-propelled agricultural machine, a good way to predict a time period that is likely to be suitable for regeneration is to couple the control device to a route planner in order to obtain therefrom information about planned work to be carried out by the machine.

Preferably, this information should relate to work to be performed on a route to be travelled, and the speed at which the route should be travelled. On the basis of this information, the control device can estimate the likely future power demand of the machine and evaluate whether it is compatible with the parameter to be held constant during regeneration, or define the value at which the parameter should be held constant and which is fitting for the likely power demand of the machine.

A resource of the machine that is monitored by the control device can be utilized as a further, alternative criterium—or a criterium that is preferably combined with the criterium described above—for predicting a suitable time period for performing regeneration. If the quantity of the resource is insufficient to enable the machine to continue operating for the amount of time required for regeneration, a time period that is suitable for regeneration cannot be predicted. If a sufficient quantity of the resource is available, then an attempt to perform regeneration is at least not ruled out.

A possible resource is a supply of an operating means, in particular, or the capacity of a crop container on the machine.

The operating parameter to be held constant can depend on the engine load and/or speed in particular.

To enable regeneration to be carried out in an energy efficient manner, the control device can be designed to consider the temperature of the filter when selecting a time period for performing regeneration.

In order to merge the need to keep the operating parameter constant with a power demand of the machine, which may vary, it can be useful for the control device to be capable of distributing the output of the internal combustion engine between a first and a second consumer of the machine during the regeneration phase. For instance, if the engine control unit specifies a fixed power output of the engine during regeneration, then, in particular, the power that is supplied to at least one of the two consumers can be adapted exactly to the demand thereof, which may change over the short term, while the second consumer must dissipate the power—which may exceed the economically or technically required demand thereof—that the first consumer is unable to take on.

Such an approach is useful in particular when the first consumer is a ground drive, the power uptake of which is directly related to the speed at which the machine moves forward. Obviously, it must be possible to change this speed over the short term in order to avoid placing the machine, the operator thereof, or other individuals and property at risk. Power that the ground drive is unable to take up since slow travel is required due to external circumstances can be dissipated by accelerating the operation of a second consumer, e.g. a cutting, threshing, or chopping mechanism. In the case of a chopping mechanism in particular, the power uptake can be randomly controlled particularly well, i.e. by varying the length of cut.

Since the power required by such a second consumer in order to function in an economically or technically meaningful manner is proportional to the quantity of crop picked up by the machine and, therefore, to the speed thereof, the power provided by the internal combustion engine during regeneration can be utilized in an ideally economic manner if the power is distributed to the ground drive and the second consumer in proportion to the demand. The machine then moves at the highest speed that is compatible with the available engine output and the power demand of the second consumer. If, for any reason, travel should not occur at this highest possible speed, and the power taken up by the ground drive is correspondingly lower, the power that is not required by the ground drive is supplied to the second consumer.

A parasitic consumer can also be used as the second consumer, the task of which is substantially only that of dissipating excess engine power in order to enable the engine to operate under stationary conditions despite a fluctuating power demand by the machine. An overflow valve in a hydraulic circuit driven by the engine is an example of a parasitic consumer.

Since the density of the crop on the field is variable, it should also be possible to vary the proportionality by which the power is distributed to the ground drive and the second consumer.

Advantageously, means for determining the proportionality during operation are present on-board the machine.

Further features and advantages of the invention will become apparent from the description of embodiments that follows, with reference to the attached figures.

DESCRIPTION OF THE PREFERRED EMBODIMENTS

Figure 1:
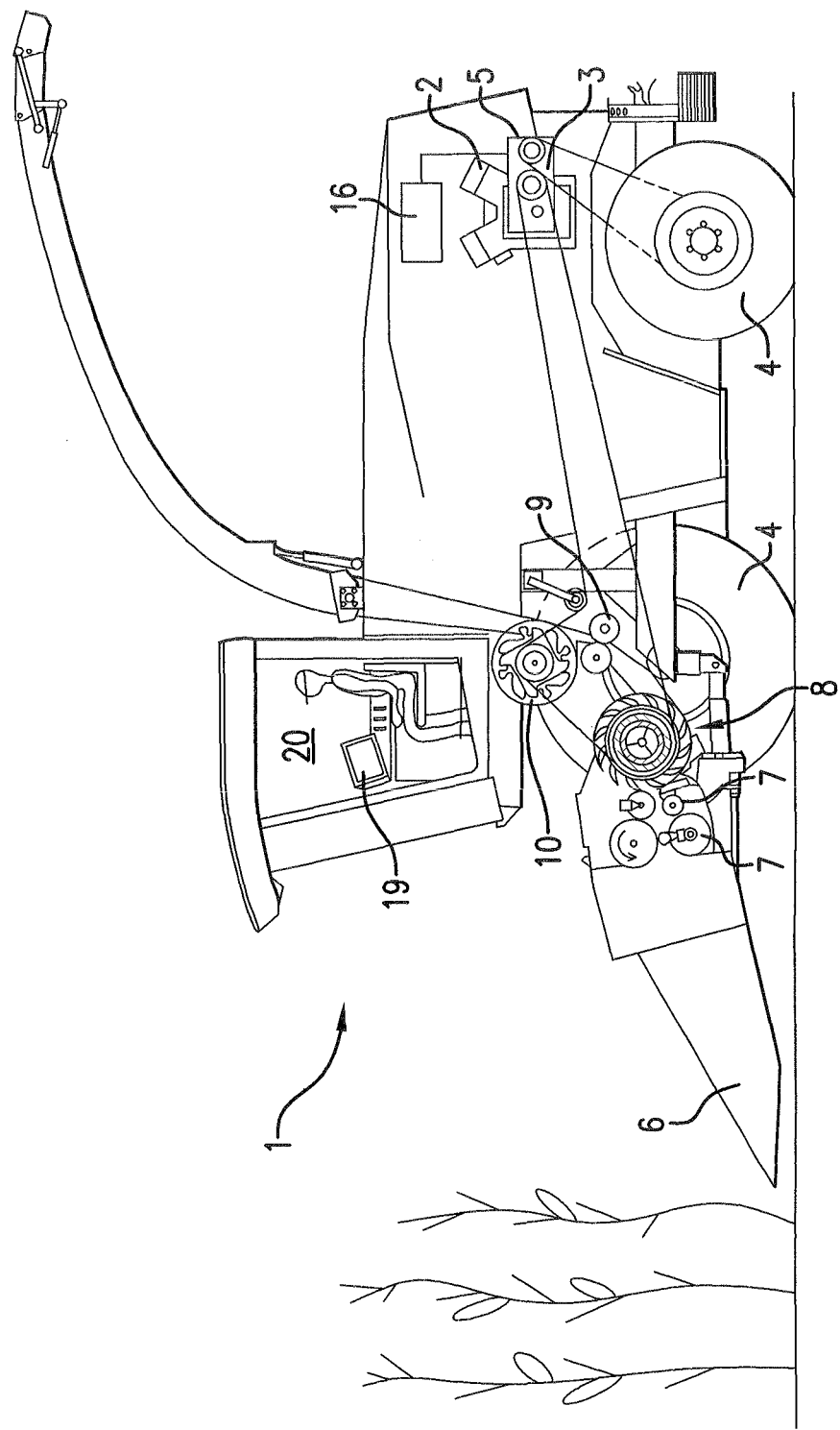
FIG. 1 shows a schematic representation of a self-propelled forage harvester, as an embodiment of a machine according to the invention.

FIG. 1 is a schematic representation of a forage harvester 1 driven by a diesel engine 2. The invention can also be applied to other self-propelled agricultural machines, such as baling presses, combine harvesters, etc., although since the invention-specific features of these various machine types do not differ to a substantial extent, it is sufficient to explain them by reference to a specific machine type as an example.

Such a machine 1 comprises a large number of components that are connected to diesel engine 2 and consume drive energy supplied by same. Within the scope of the present invention, these components can be combined, for simplication, to form one first consumer 3 which mainly comprises a ground drive having wheels 4, and a second consumer 5 which comprises components that are driven to process crop picked up by the machine, such as a header 6, pairs of rollers 7 for conveying and compressing the cut crop, a chopper drum 8, conditioning rollers 9, and a post-accelerator 10.

The drive power of diesel engine 2 is distributed to the two consumers 3, 5 via an auxiliary gearbox 11. Auxiliary gearbox 11 has two drive shafts 12, 13 for driving the first and second consumer 3, 5, the speed ratio—relative to one another—of which is adjustable in order to distribute the power of engine 2 to the two consumers 3, 5 in a desired proportion.

To enable the power uptake of consumer 5 to be varied while retaining the same speed and a constant crop throughput, the speed of the chopper drum can be variable in particular. The faster it operates (while rollers 7 which convey the crop retain the same speed), the more finely the crop material is chopped, i.e. the greater the power is that is required to process a crop flow of a given magnitude.

Figure 2:
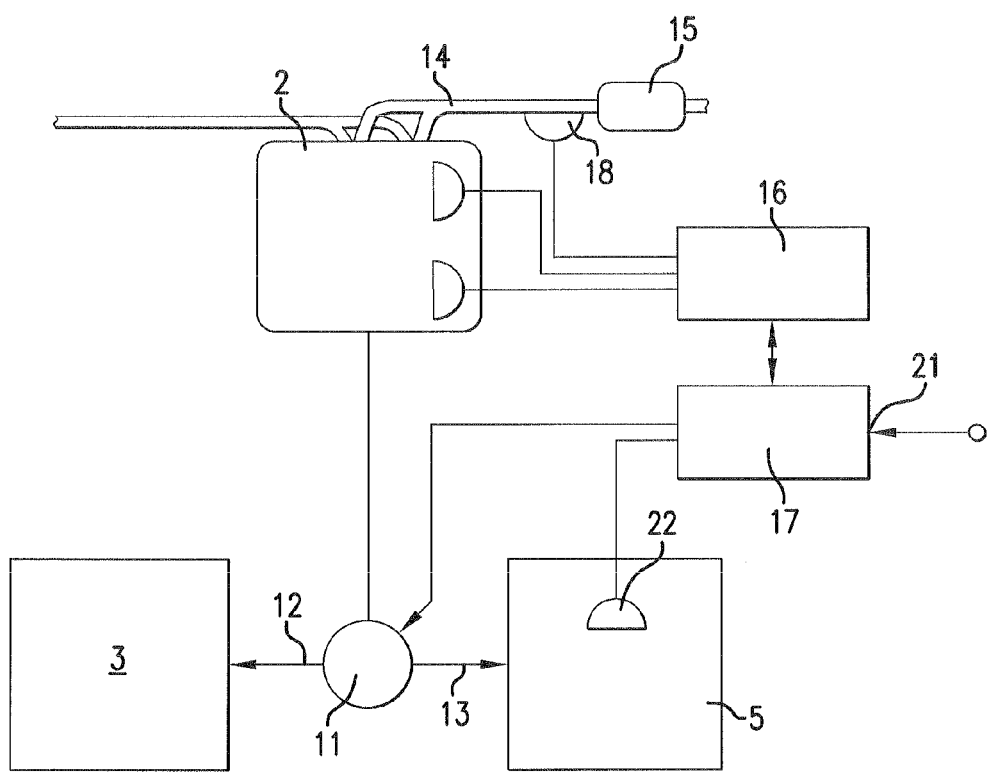
FIG. 2 shows a block diagram of the drive system of the forage harvester according to the invention.

As shown in FIG. 2, a particulate filter 15 is disposed in an exhaust-gas line 14 of diesel engine 2 in order to capture soot particles contained in the exhaust gas of diesel engine 2. An electronic engine control unit 16 controls the injection of fuel into engine 2 in accordance with a setpoint value—which is specified by a higher-order control unit 17—of an operating parameter of engine 2, such as speed, torque, power output, or the like. Engine control unit 16 is connected in this case to a pressure sensor 18 disposed between engine 2 and particulate filter 15, in order to estimate the quantity of soot stored in filter 15 on the basis of an overpressure present in exhaust-gas line 14 upstream of the particulate filter, and to decide, on the basis of said estimated value whether regeneration of particulate filter 15 is required, or to estimate the amount of operating time that remains before regeneration of filter 15 is likely to become necessary.

An application plan for the forage harvester is stored in control unit 17, having been received from an external route planner. Given that the route planner creates such application plans in a coordinated manner for all machines involved in an application, e.g. for forage harvesters used to harvest one or more fields, and hauling vehicles for the crop, a high level of efficiency and cost-effectiveness can be attained. By reference to the application plan, control unit 17 can estimate how to approach the next path to be travelled, in particular whether it involves travel on a road or a harvesting operation on a field. In the latter case, it estimates the additional amount of time required to travel the route for the harvesting operation and, if it is longer than the time period required to regenerate filter 15, and exhaustion of an operating means such as fuel is not anticipated to occur within this time period—which would necessitate an interruption in operation for replenishment—, then the current point in time is suitable for starting regeneration. Other operating means—the imminent exhaustion thereof having the potential to thwart regeneration during on-going operation—which must be monitored are the supply of lacing twine or wrapping film in the case of a baling press, for example, and the capacity of a grain tank of a combine harvester.

If control unit 17 detects, by reference to the application plan, that a suitable point in time for starting regeneration is present toward the end of the remaining operating time of filter 15, which was reported by engine control unit 16, then it initiates regeneration at this point in time. A message to this effect is sent to a display 19 in driver's cab 20 of forage harvester 1 so that the driver knows why forage harvester 1 may respond differently to input from the driver, in particular to actuation of the gas pedal, than it would during normal operation without on-going regeneration, and to prompt him to avoid making entries that are not compatible with regeneration, such as turning the engine off.

The temperature of the filter can be considered in the decision as to whether the end of the remaining operating time of filter 15 is "close". If it is high, because the machine has already been operating under a high load for a long period of time, then the question can be answered in the affirmative more generously than would be the case with a cold filter, because the quantity of energy required to bring filter 15 to the regeneration temperature is low in this case.

Basically, regeneration can be carried out at different stationary speeds and/or engine loads, although the additional quantity of fuel to be injected for regeneration, and possibly the distribution of injection over time, differs for various values of speed and/or output. If the speed and/or output change during regeneration, and fuel metering and injection cannot be adapted by the delay that is correct in the particular situation, or even in advance at all, there is a risk that filter 15 will undergo harmful overheating or under-cooling which would bring on-going combustion of the soot in filter 15 to a halt. To eliminate the risk of overheating, engine control unit 16 is designed to abort regeneration if the speed and/or output fluctuate too greatly over the course thereof.

According to a preferred development, engine control unit 16 is furthermore designed to examine—while regeneration is underway—an input entered by the driver, which is suitable for influencing the speed and/or output, such as an actuation of the gas pedal, to determine the magnitude thereof and to ignore it if this magnitude does not exceed a significance threshold, and to thereby further limit fluctuations in speed and/or output.

Control unit 17 estimates, by reference to the information in the application plan, a mean power demand of the combine harvester during regeneration and, on the basis of this estimate, specifies setpoint values for the speed and/or output of engine 2 during regeneration.

To regenerate filter 15 properly, engine 2 must run substantially continuously at said specified speed or power for as long as regeneration is underway. By using a tachometer and a crop sensor 22 disposed at any suitable point on second consumer 5, such as on rollers 7, 8 or post-accelerator 11, control unit 17 is capable of estimating the density of the crop on the field. On the basis of said density, control unit 17 determines a ratio between the power required to move forage harvester 1, and the power required by second consumer 5 to process the crop obtained by said movement of the forage harvester. Provided control unit 17 does not receive any commands to the contrary from the driver at input 21, it holds the engine at the specified speed or power and regulates the power distribution in auxiliary gearbox 11 in accordance with the above-mentioned ratio. If control unit 17 receives a command from the driver at input 21 to decelerate the travel, e.g. to perform a turning maneuver in the headland, then such a deceleration is achieved by adjusting auxiliary gearbox 11, i.e. second consumer 5 accelerates by the magnitude by which forage harvester 1 decelerated. Since the headland contains no crop, such accelerated operation does not affect the quality of the processed crop.

As stated initially, the present application can be applied to a combine harvester. In the case of a combine harvester, however, it is not possible to randomly vary the power used to drive the threshing mechanism since a poor adaptation of the threshing mechanism output to the ground speed or the crop throughput linked to the ground speed leads to unsatisfactory threshing results. In this case it is therefore more useful to consider the ground drive and threshing mechanism in combination as a first consumer, and to utilize a blower that cools the engine as a second consumer for dissipating excess engine power during regeneration. The speed of said blower can be increased far above a value that is technically required to cool the engine without impairing the function of the combine harvester. Alternatively or in addition thereto, an overflow valve having a controllable throughput rate can be provided as the second consumer, which diverts the fluid from a hydraulic circuit, e.g. a hydrostatic drive.

In the preceding description it was assumed that the fuel injection at engine 2 is manipulated by engine control unit 16 in order to heat up particulate filter 15 for regeneration. However, the present invention is not dependent upon the manner in which the filter is heated, and can also be applied to an agricultural machine in particular in which an electric heater or burner—which is supplied by the same fuel tank as the engine—is provided for heating the particulate filter.

It will be understood that each of the elements described above, or two or more together, may also find a useful application in other types of constructions differing from the types described above.

While the invention has been illustrated and described as embodied in an agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural machine, comprising
   an internal combustion engine having an exhaust-system branch;
   a particulate filter disposed in said exhaust-system branch of said internal combustion engine;
   a control unit controlling a heat source in a regeneration phase in such a manner that a temperature is reached in said particulate filter that is required for its regeneration, and to abort an on-going regeneration if at least one operating parameter of the agricultural machine that influences the regeneration deviates from a setpoint value;

a control device predicting a time period in which it is likely possible to hold the operating parameter to the setpoint value and to start the regeneration when this time period begins; and at least one first and at least one second consumer driven by said internal combustion engine, wherein said control device distributes a power output by said internal combustion engine that results by holding the operating parameter constant during the regeneration between said consumers.

2. The agricultural machine as defined in claim 1, wherein said internal combustion engine is the heat source, and said engine control unit is an internal combustion engine control unit.

3. The agricultural machine as defined in claim 1, wherein the control unit controls the heat source to abort an on-going regeneration if at least one operating parameter of the agricultural machine that influences the regeneration deviates from a setpoint value, which is specified at the beginning of every regeneration.

4. The agricultural machine as defined in claim 1, wherein said control device is coupled to a route planner for predicting the time period on a basis of information received by said route planner.

5. The agricultural machine as defined in claim 4, wherein said control device receives information from said route planner related to work to be performed on a route to be travelled, and a speed at which the route should be travelled.

6. The agricultural machine as defined in claim 1, wherein said control device monitors at least one resource of the agricultural machine and starts the regeneration only if an available quantity of the resource suffices to operate the agricultural machine during a time period required for regeneration.

7. The agricultural machine as defined in claim 6, wherein said resource is a resource selected from the group consisting of a supply of an operating means and a capacity of a crop container.

8. The agricultural machine as defined in claim 1, wherein the agricultural machine holds the operating parameter constant in dependence on a parameter selected from the group consisting of an engine load, an engine speed, and both.

9. The agricultural machine as defined in claim 1, wherein the control device considers the temperature of the filter when selecting a time period for performing the regeneration.

10. The agricultural machine as defined in claim 1, wherein said first consumer comprises a ground drive.

11. The agricultural machine as defined in claim 1, wherein said second consumer comprises a blower that provides an action selected from the group consisting of cooling said internal combustion engine, cooling an overflow valve, and cooling both.

12. The agricultural machine as defined in claim 1, wherein said control device considers, when distributing power to a ground drive and to said second consumer, both a desired ground speed and a proportionality between a power required by said ground drive and said second consumer at the desired speed in that, if the power to be distributed corresponds at least to a sum of these required powers, the power required by said ground drive is supplied thereto, and a remaining power is supplied to said second consumer, although, if the power to be distributed is less than this sum, then said ground drive and said second consumer are each supplied with a same proportion of power required by each.

13. The agricultural machine as defined in claim 12, wherein said control device operates so that the proportionality is variable.

14. The agricultural machine as defined in claim 12, further comprising means for determining the proportionality during operation of the agricultural machine.

* * * * *